United States Patent
Contino et al.

(10) Patent No.: US 8,588,418 B2
(45) Date of Patent: *Nov. 19, 2013

(54) USER LEVEL SECURITY FOR AN EMULATED REMOVABLE MASS STORAGE DEVICE

(75) Inventors: Jeffrey R. Contino, Shawnee, KS (US);
Warren B. Cope, Olathe, KS (US);
Douglas Alan Olding, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1357 days.

This patent is subject to a terminal disclaimer.

(21) Appl. No.: 12/234,830

(22) Filed: Sep. 22, 2008

(65) Prior Publication Data

US 2010/0077448 A1    Mar. 25, 2010

(51) Int. Cl.
| | |
|---|---|
| H04K 1/00 | (2006.01) |
| H04L 29/06 | (2006.01) |
| G06F 7/04 | (2006.01) |
| G06F 15/16 | (2006.01) |
| G06F 17/30 | (2006.01) |

(52) U.S. Cl.
USPC ........ 380/270; 726/3; 726/4; 726/9; 709/229; 713/168; 713/183; 713/184; 370/259; 370/335; 370/414; 455/418; 455/419; 455/420

(58) Field of Classification Search
USPC ....... 726/3, 4, 9; 709/229; 380/270; 713/168; 713/183, 184; 370/259, 338, 414; 455/418–420
See application file for complete search history.

(56) References Cited

U.S. PATENT DOCUMENTS

| | | | |
|---|---|---|---|
| 2002/0078367 A1* | 6/2002 | Lang et al. | 713/200 |
| 2003/0074529 A1 | 4/2003 | Crohas | |
| 2003/0216954 A1 | 11/2003 | Buzzelli | |
| 2005/0070329 A1* | 3/2005 | Lection et al. | 455/557 |
| 2005/0191998 A1* | 9/2005 | Onyon et al. | 455/419 |
| 2006/0010270 A1 | 1/2006 | Zhang | |
| 2006/0069814 A1* | 3/2006 | Abraham et al. | 710/8 |
| 2006/0218397 A1* | 9/2006 | Brown et al. | 713/168 |
| 2006/0282571 A1* | 12/2006 | Choi et al. | 710/62 |
| 2007/0011724 A1* | 1/2007 | Gonzalez et al. | 726/4 |
| 2007/0143307 A1 | 6/2007 | Bowers et al. | |

(Continued)

FOREIGN PATENT DOCUMENTS

WO    2008067432    6/2008

OTHER PUBLICATIONS

USPTO Office Action Summary mailed Nov. 17, 2010 from U.S. Appl. No. 11/945,524.
CNET Reviews; "Tritton WiFi NAS;" Nov. 26, 2007; 4 pages; http://reviews.cnet.com/external-hard-drives/tritton-wifi-nas/4505-3190_7-31149112.html?tag=mp.

(Continued)

*Primary Examiner* — Edan Orgad
*Assistant Examiner* — Kari Schmidt

(57) ABSTRACT

A communication session is established, via a wireless communication link, with a mobile communication device that is connected to a computer system. The mobile communication device is enumerated by the computer system as a locally attached mass storage device. An authentication executable file is sent to the mobile communication device. A response generated by the computer system executing the authentication executable file is received from the mobile communication device. Based on the response generated by the computer system executing the authentication executable file, access to a data file that is stored by a mass storage system via a network is granted.

15 Claims, 5 Drawing Sheets

(56) References Cited

U.S. PATENT DOCUMENTS

| | | | |
|---|---|---|---|
| 2007/0156850 A1* | 7/2007 | Corrion | 709/219 |
| 2007/0186212 A1 | 8/2007 | Mazzaferri et al. | |
| 2007/0198656 A1 | 8/2007 | Mazzaferri et al. | |
| 2007/0201502 A1 | 8/2007 | Abramson | |
| 2007/0204115 A1 | 8/2007 | Abramson | |
| 2007/0289000 A1 | 12/2007 | Weiss | |
| 2008/0016187 A1* | 1/2008 | Neil et al. | 709/220 |
| 2008/0040618 A1* | 2/2008 | Andersson et al. | 713/193 |
| 2008/0082310 A1 | 4/2008 | Sandorfi et al. | |
| 2008/0126584 A1* | 5/2008 | Mullis et al. | 710/7 |
| 2008/0184125 A1 | 7/2008 | Suleiman et al. | |
| 2009/0024757 A1* | 1/2009 | Proctor | 709/232 |
| 2009/0222655 A1 | 9/2009 | Martinent et al. | |
| 2010/0049895 A1* | 2/2010 | Liang | 710/308 |

OTHER PUBLICATIONS

Micro Anvika UK; "ASUS 40GB Wireless Hard Disk Drive," Nov. 26, 2007; 2 pages; http://www.microanvika.com/product.asp?TXT=INFO&PNO=ASU54305A&ref=sidebanner&cam=ASU54305A.

Belkin; "Wireless G USB Network Adapter," Nov. 26, 2007; 2 pages; http://catalog.belkin.com/IWCatProductPage.process?Product_Id=179211.

Memsen Corporation; "Mobile Interactive Marketing—Coming Soon!;" Nov. 26, 2007; 7 pages; http://www.memsen.com/datavendor_desc.htm.

Memsen Corporation; "Everybody has something to Share;" Nov. 26, 2007; 1 page; http://www.memsen.com/index.htm.

* cited by examiner

USER LEVEL SECURITY FOR AN EMULATED REMOVABLE MASS STORAGE DEVICE

TECHNICAL BACKGROUND

Small, lightweight, removable and rewritable storage devices are becoming more popular. These devices, such as Universal Serial Bus (USB) "keychain drives" or USB flash drives, offer advantages over floppy disks. They are smaller, faster, more reliable, and more durable than floppy disks. Their reliability and durability is typically a result of the fact that these drives have no moving parts.

To access or store data on a USB flash drive, the drive must be connected to a computer. Typically, this is done by plugging the flash drive into a USB port built into the computer. These flash drives, like other USB devices, often can be connected and disconnected from the computer without opening the computer's enclosure. Once connected, the computer can then communicate with the USB flash drive using the USB mass storage standard. This standard is supported by many modern operating systems such as Windows and Linux. The USB connection may also supply power to the USB flash drive.

The Universal Serial Bus is defined in the Universal Serial Bus Specification, revision 1.1 and Universal Serial Bus Specification, revision 2.0 which are hereby incorporated herein by reference. These documents are available from the USB Implementers Forum web page at www.usb.org.

OVERVIEW

A method of operating a communication system is disclosed. A communication session is established, via a wireless communication link, with a mobile communication device that is connected to a computer system. The mobile communication device is enumerated by the computer system as a locally attached mass storage device. An authentication executable file is sent to the mobile communication device. A response generated by the computer system executing the authentication executable file is received from the mobile communication device. Based on the response generated by the computer system executing the authentication executable file, access to a data file that is stored by a mass storage system via a network is granted.

A communication system is disclosed. An access network that establishes, via a wireless communication link, a communication session with a mobile communication device that is connected to a computer system. The mobile communication device is enumerated by the computer system as a locally attached mass storage device. The access network sends an authentication executable file to the mobile communication device and receives, from the mobile communication device, a response generated by the computer system executing the authentication executable file. A mass storage system grants, based on the response generated by the computer system executing the authentication executable file, access to a data file that is retrieved via a network.

A mobile communication device is disclosed. A first interface is adapted to receive data from a computer system as data destined for a locally connected mass storage device. A wireless communication interface is adapted to wirelessly receive an authentication executable file and send an authentication response generated by the computer system executing the authentication executable file. Based on the authentication response, the wireless communication interface sends the data destined for the locally connected mass storage device via a wireless network and a wired network to a storage network for storage.

DETAILED DESCRIPTION

Figure 1:
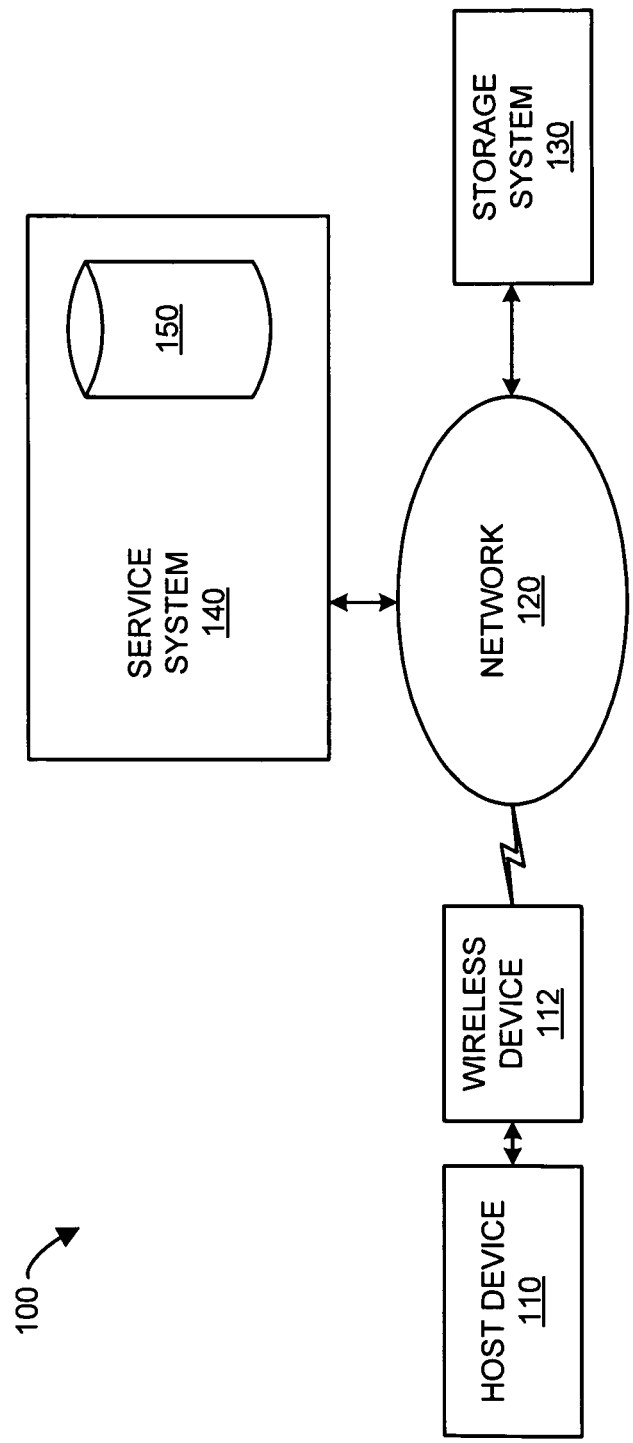
FIG. 1 is a block diagram illustrating a communication system, with security, that emulates a mass storage device.

FIG. 1 is a block diagram illustrating a communication system, with security, that can emulate a mass storage device. In FIG. 1, communication system 100 comprises host device 110, wireless device 112, network 120, service system 140, and storage system 130. Service system 140 includes database 150. Host device 110 is connected to wireless device 112. Wireless device 112 is operatively coupled to network 120 via a broadband wireless connection. Thus, host device 110 is operatively coupled to network 120 via wireless device 112. Network 120 is operatively coupled to service system 140. Network 120 is also operatively coupled to storage system 130. Since service system 140 includes database 150, and network 120 and storage system 130 are both operatively coupled to service system 140, network 120 and storage system 130 are operatively coupled to database 150.

Network 120 may be any network or collection of networks that couple, link, or otherwise operatively connect wireless device 112 with other devices or systems and is also operatively coupled to storage system 130. Network 120 may include other secondary data networks. In an example, network 120 may include a backhaul network, a local network, a long distance network, or a packet network, or any combination thereof, as well as other types of networks.

In an example, communication network 120 may be, or include all or parts of an IEEE 802.16 (WiMAX) specified system. These parts may include a base station (BS), an access services network (ASN), or connectivity service network (CSN). In another example, service system 140 may also be a part of a WiMAX specified system.

Service system 140 may be any system or collection of systems, such as database 150, capable of storing and retrieving information about at least one of: (a) services provided by network 120; (b) services provided by or to networks or users connected to network 120; or, (c) configuration information for network 120. In an example, service system 140 is part of a CSN and performs authentication, authorization, and accounting operations. Service system 140 may manage user or device profiles for authentication (e.g., verifying device identifier, username, or password).

Service system 140 may provide configuration information to network 120 that specifies a type of service to deliver, and policies to enforce that may restrict access by, or services provided to, wireless device 112. For example, when wireless device 112 first couples to network 120, wireless device 112 may send a registration message to network 120 asking for permission to use network 120 to communicate to other systems. The registration message may include a device identifier. Network 120 may then forward that registration message, along with a device identifier to service system 140. Service system 140 may then query database 150 with the device identifier to determine if wireless device 112 may use network 120. Service system 140 may then inform network 120 whether wireless device 112 may use network 120.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 140 may also query database 150 to provide configuration information to network 120 that determines how wireless device 112 may use network 120. For example, service system 140 may configure network 120 to operatively couple wireless device 112 only to storage system 130. This configuration would prevent wireless device 112 from utilizing other services such as operatively coupling to internet servers for viewing web pages.

Service system 140 may also configure network 120 to process packets coming from, or destined for, wireless device 112. For example, service system 140 may configure network 120 to translate packets received from wireless device 112 from one format or protocol to another before sending these translated packets to storage system 130. In another example, service system 140 may configure network 120 to translate packets received from storage system 130 from one format or protocol to another before sending these translated packets to wireless device 112. It should also be understood that service system 140 may include additional elements not pictured for the sake of clarity.

Wireless device 112 may be any device, system, or other such communication platform capable of wirelessly communicating with network 120. Wireless device 112 may be, for example, a mobile phone, a wireless phone, a wireless modem, a wireless USB modem, a personal digital assistant (PDA), as well as other types of devices or systems that can communicate wirelessly with network 120.

Wireless device 112 may process enumeration requests to and from host device 110. For example, wireless device 112 may be connected to host device 110 via a USB port. To successfully communicate with each other, host device 110 and wireless device 112 perform a USB enumeration process. This enumeration process is described in the Universal Serial Bus Specifications, revisions 1.1 and 2.0.

The enumeration process may also include a configuration process. To accomplish the configuration process, wireless device 112 may supply host device 110 with information about wireless device 112. One type of information that may be supplied to host device 110 by wireless device 112 is a device class. A device class helps inform host device 110 about the characteristics of wireless device 112. A device class may also help inform host device 110 about the protocols or capacities of wireless device 112. For example, wireless device 112 may inform host device 110 that it is a serial communication device, such as a modem.

In an embodiment, wireless device 112 informs host device 110 that wireless device 112 should be configured and controlled as a mass storage device. For example, wireless device 112 may, as part of a USB enumeration process, inform host device 110 that it should be enumerated as, and thus treated as, a USB Mass Storage Class (MSC) device.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page at www.usb.org.

As a result of wireless device 112 informing host device 110 that wireless device 112 should be configured and controlled as a mass storage device, host device 110 may treat wireless device 112 as a locally attached mass storage device. For example, host device 110 may enumerate wireless device 112 as a USB flash drive. That may mean that host device 110 would use portions of its operating system software, such as device drivers, intended to be used with a USB flash drive to configure, control, and communicate with wireless device 112. Host device 110 may use these portions of its operating system software even though wireless devices in general would normally be enumerated as communication devices.

If host device 110 is treating wireless device 112 as a locally attached mass storage device, it allows wireless device 112 to be treated as locally attached mass storage by non-driver parts of the operating system and applications. For example, if host device 110 were running a Windows XP operating system, wireless device 112 may appear under the "Devices with Removable Storage" heading of the "My Computer" folder. Alternatively, wireless device 112 may appear under the "Hard Disk Drives" heading of the "My Computer" folder.

In an embodiment, when wireless device 112 is initially connected to network 120, service system 140 may require user level authentication before configuring network 120 to allow wireless device 112 access to storage system 130. In an embodiment, network 120 sends an authentication executable file to wireless device 112. This authentication executable file may be executed by host device 110.

When executed by host device 110, the authentication executable file may prompt the user for a username and/or password. The authentication executable file may then send the user responses to network 120 via wireless device 112. Network 120 may then send the user responses to service system 140. If the user supplied an appropriate username and corresponding password, service system 140 may configure network 120 to give host device 110 access to storage system 130 via wireless device 112.

In an embodiment, the authentication executable file may be automatically executed by host device 110 when wireless device 112 is enumerated as a locally attached mass storage device. For example, the authentication executable file may be automatically executed by informing host device 110 that there is an "autorun.inf" file in the root directory of the locally attached mass storage device being emulated by wireless device 112. The "autorun.inf" file may then be automatically read by host device 110. The "autorun.inf" file supplied to host device 110 may then specify that the authentication executable file be executed by host device 110.

In an embodiment, communication system 100 may require a user to manually run the authentication executable file. For example, the authentication executable file may appear as a "login.exe" file in the root directory of the locally attached mass storage device being emulated by wireless device 112. The "login.exe" file may then be executed when the user takes a certain action such as double clicking on the "login.exe" filename or icon.

In an embodiment, the authentication executable file may encrypt the user's responses before sending them. Thus, the user's responses may need to be decrypted before access to storage system 130 is granted. In an embodiment, communication system 100 may match the device identifier of wireless device 112 to the username and password responses sent by host device 110 when executing the authentication executable file. Thus, access to storage system 130 by host device 110 is dependent upon the device identifier associated with wireless device 112 as well as a correct username and password.

Host device 110 may also use communication and configuration protocols intended for locally attached mass storage devices to communicate with wireless device 112. Wireless device 112 may emulate a mass storage device by also using the corresponding communication and configuration protocols to communicate with host device 110. For example, host device 110 may use Advanced Technology Attachment Packet Interface (ATAPI) command blocks and command sets to communicate with wireless device 112. Likewise, wireless device 112 would use ATAPI command blocks and command sets to communicate with host device 110.

In another example, host device 110 may use the Small Computer System Interface (SCSI) commands to communicate with wireless device 112. Likewise, wireless device 112 would use SCSI commands to communicate with host device 110. In the preceding examples, these protocols may be encapsulated in USB packets for communication with wireless device 112 via a USB port on host device 110.

Network 120 may process packets of data it receives from wireless device 112 via a wireless communication link. These packets of data may, for example, comprise data destined for storage by storage system 130. In another example, these packets of data may contain data with communication and configuration protocols intended for locally attached mass storage devices to communicate. For example, wireless device 112 may send, and network 120 may receive and process, packets of data with Advanced Technology Attachment Packet Interface (ATAPI) command blocks and command sets. In another example, wireless device 112 may send, and network 120 may receive and process, Small Computer System Interface (SCSI) commands. In another example, these protocols may be encapsulated in USB packets and wireless device 112 may send, and network 120 may receive and process these USB packets.

Network 120 may process packets of data received from wireless device 112 to translate them into data or commands for storage system 130. Network 120 may also process packets of data received from storage system 130 to translate them into data or commands for wireless device 112. For example, network 120 may translate packets of data received from wireless device 112 into commands or data that is understood by a storage area network (SAN). Network 120 may also translate packets of data received from a SAN into data or commands for wireless device 112.

In another example, network 120 may translate packets of data received from wireless device 112 with ATAPI, SCSI, or USB commands or protocols into commands or data that may be understood by a SAN. Network 120 may also translate packets of data received from a SAN into ATAPI, SCSI, or USB commands or protocols. These packets from a SAN, once translated, may be sent to wireless device 112.

Storage system 130 is computer data storage connected to a computer network providing data access to network clients. For example, storage system 130 may be a SAN or network attached storage (NAS). Storage system 130 may also be a part of network 120. Storage system 130 may comprise storage and a network that is separate from, but operatively coupled to, network 120.

Figure 2:
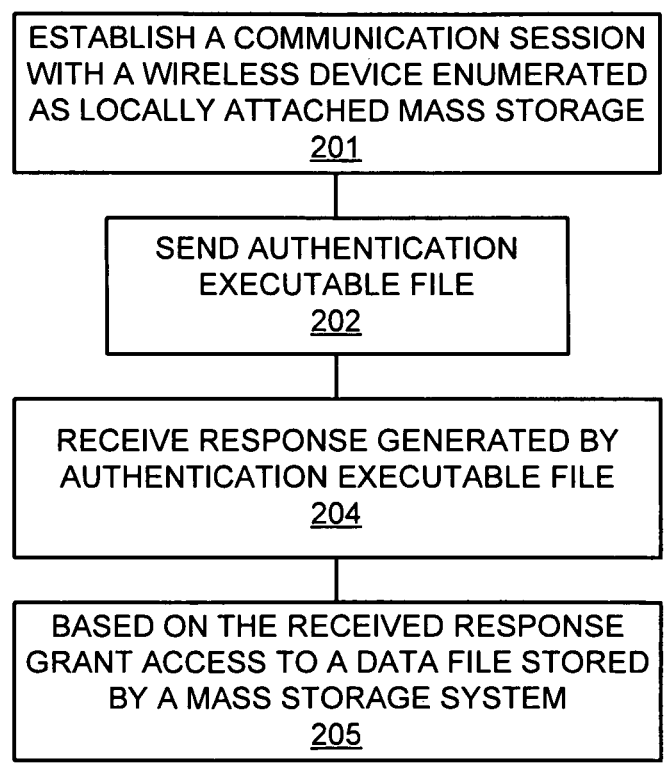
FIG. 2 is a flowchart illustrating a method of operating a communication system.

FIG. 2 is a flowchart illustrating a method of operating a communication system. The method of FIG. 2 may be performed by one or more elements of communication system 100. A communication session is established with a wireless device that is enumerated as locally attached mass storage (201). For example, network 120 may establish a communication session with wireless device 112. Wireless device 112 may be enumerated by host device 110 as a locally attached mass storage device.

An authentication executable file is sent (202). For example, wireless device 112 may receive an authentication executable file from network 120. Wireless device 112 may present this authentication executable file to host device 110 as a file that is stored in the root directory of the locally attached mass storage device that wireless device 112 is emulating. Host device 110 may then execute the authentication executable file.

By running the authentication executable file, host device 110 may then prompt a user for a username and password. Host device 110, under the control of the authentication executable file, may then send the user's responses to network 120 via wireless device 112. Host device 110 may send the user's responses by writing to a file that is stored in the root directory of the locally attached mass storage device that wireless device 112 is emulating. This may cause wireless device 112 to send the user's responses to network 120 and/or service system 140. In an embodiment, the authentication executable file may first encrypt the user's responses before they are sent to network 120. Thus, network 120 or service system 140 may decrypt the user's responses.

A response generated by the authentication executable file is received (204). For example, service system 140 may receive a username and password from host system 110 that was generated by host system 110 running the authentication executable file. Based on the received response, access is granted to a data file stored by a mass storage system (205). For example, based on a username and password received in block 204, service system 140 may configure network 120 to grant access to a file stored on storage system 130.

Figure 3:
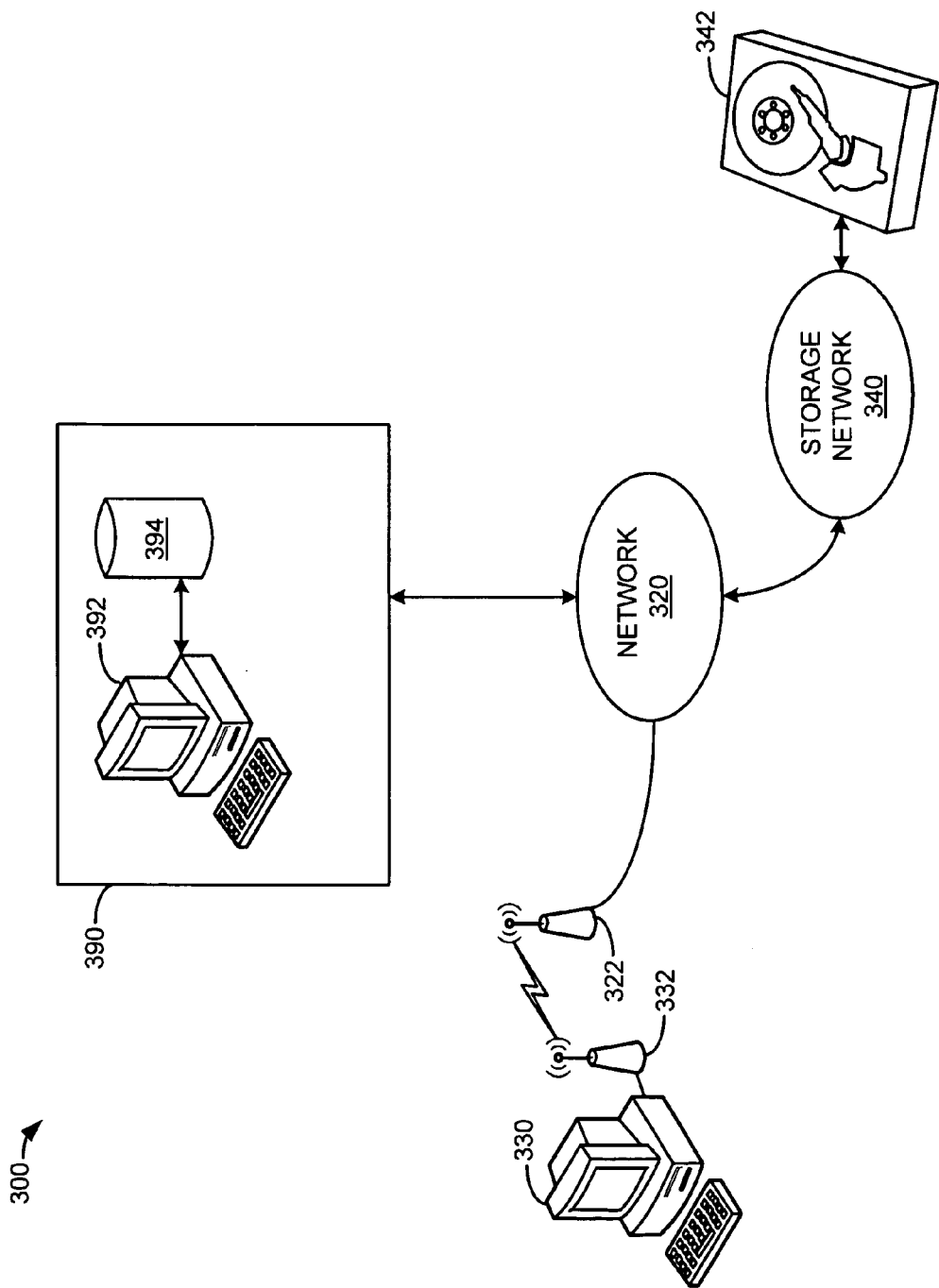
FIG. 3 is a block diagram illustrating a communication system, with security, that can emulate a mass storage device.

FIG. 3 is a block diagram illustrating a communication system, with security, that can emulate a mass storage device. In FIG. 3, communication system 300 comprises host computer 330, wireless device 332, base station 322, network 320, storage network 340, storage 342, and service system 390. Service system 390 includes computer system 392 and database 394. Host computer 330 is locally and physically connected to wireless device 332. Wireless device 332 is operatively coupled to base station 322 via a long range wireless link. Base station 322 is operatively coupled to network 320. Thus, host computer 330 is operatively coupled to network 320 via wireless device 332 and base station 322.

Network 320 is operatively coupled to service system 390. Network 320 is also operatively coupled to storage network 340. Storage network 340 is operatively coupled to storage 342. Since service system 390 includes computer system 392 and database 394, and network 320, storage network 340, and storage 342 are all operatively coupled to service system 390, then network 320, storage network 340, and storage 342 are operatively coupled to computer system 392 and database 394.

Network 320 could be any network or collection of networks that couple, link, or otherwise operatively connect base station 322, and by extension wireless device 332, with other devices or systems and is also operatively coupled to storage network 340. Network 320 may include other secondary data networks. In an example, network 320 may include a backhaul network, a local network, a long distance network, or a packet network, or any combination thereof, as well as other types of networks.

In an example, communication network 320 may be, or include all or parts of an IEEE 802.16 (WiMAX) specified system. These parts may include additional base stations, an access services network (ASN), or connectivity service network (CSN). In another example, service system 390 may also be a part of a WiMAX specified system.

Service system 390 may be any system or collection of systems, such as computer system 392 and database 394, that is capable of storing and retrieving information about at least one of: (a) services provided by network 320, such as communication and storage services; (b) services provided by, or to, networks or users, connected to network 320, such as communication or storage services; or, (c) configuration information for network 320. Service system 390 can also configure network 320. In an example, service system 390 is part of a CSN and performs authentication, authorization, and accounting (AAA) operations. Service system 390 may manage user or device profiles for authentication (e.g., verifying device identifier, username, or password).

Service system 390 may also configure network 320 to that specify the type of service to deliver, and policies to enforce that may restrict access by, or services provided to, wireless device 332 or host computer 330. For example, when wireless device 332 first couples to base station 322, wireless device 332 may send a registration message to network 320 asking for permission to use network 320 to communicate to other systems. The registration message may include a device identifier. Network 320 may then forward that registration message, along with a device identifier to service system 390. Service system 390 may then use computer system 392 to query database 394 with the device identifier to determine if wireless device 332 or host computer 330 may use base station 322 and network 320. Service system 390 may then inform network 320 or base station 322 whether mobile device 332 or host computer 330 may use network 320.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 390 may also query database 394 to configure network 320 in a way that determines how wireless device 332 or host computer 330 may use network 320. For example, service system 390 may configure network 320 to only operatively couple wireless device 332 to storage network 340. By extension, this configuration would function to limit host computer 330 to only being operatively coupled with storage network 340 and storage 342. This configuration may also prevent host computer 330 from utilizing other services such as operatively coupling to internet servers for viewing web pages.

Service system 390 may also configure network 320 to process packets coming from, or destined for, host computer 330. For example, service system 390 may configure network 320 to translate packets received from wireless device 332 from one format or protocol to another before sending these translated packets to storage 342 via storage network 340. In another example, service system 390 may configure network 320 to translate packets received from storage 342 via storage network 340 from one format or protocol to another before sending these translated packets to wireless device 332. It should also be understood that service system 390 may include additional elements not pictured for the sake of clarity.

Wireless device 332 may be any device, system, or other such communication platform capable of wirelessly communicating with base station 322 and thus network 320. Wireless device 332 may be, for example, a mobile phone, a wireless phone, a wireless modem, a wireless USB modem, a personal digital assistant (PDA), as well as other types of devices or systems that can communicate wirelessly with network 320.

Wireless device 332 may process enumeration requests to and from host computer 330. For example, wireless device 332 may be connected to host computer 330 via a USB port. To successfully communicate with each other, host computer 330 and wireless device 332 perform a USB enumeration process. This enumeration process is described in the Universal Serial Bus Specifications, revisions 1.1 and 2.0.

The enumeration process may also include a configuration process. To accomplish the configuration process, host computer 330 may request, and wireless device 332 may then supply, host computer 330 with information about wireless device 332. One type of information that may be supplied to host computer 330 by wireless device 332 is a device class. A device class helps inform host computer 330 about the characteristics of wireless device 332. A device call may also help inform host computer 330 about the protocols or capacities of wireless device 332. For example, wireless device 332 may inform host computer 330 that it is a serial communication device, such as a modem.

In an embodiment, wireless device 332 informs host computer 330 that wireless device 332 should be configured and controlled as a mass storage device. For example, wireless device 332 may, as part of a USB enumeration process, inform host computer 330 that it should be treated as a USB Mass Storage Class (MSC) device.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page at www.usb.org.

As a result of wireless device 332 informing host computer 330 that wireless device 332 should be configured and controlled as a mass storage device, host computer 330 may treat wireless device 332 as a locally attached mass storage device. For example, host computer 330 may enumerate wireless device 332 as a USB flash drive. That means that host computer 330 would use portions of its operating system software, such as device drivers, intended to be used with a USB flash drive to configure, control, and communicate with wireless device 332. Accordingly, host computer 330 would be controlling and communicating with wireless device 332 as if it was a USB flash drive. Host computer 330 may use these portions of its operating system software even though wireless devices in general would normally be enumerated as communication devices.

If host computer 330 is treating wireless device 332 as a locally attached mass storage device, it allows wireless device 332 to be treated as locally attached mass storage by non-driver parts of the operating system and applications. For example, if host computer 330 were running a Windows XP operating system, wireless device 332 may appear under the "Devices with Removable Storage" heading of the "My Computer" folder. Alternatively, wireless device 332 may appear under the "Hard Disk Drives" heading of the "My Computer" folder.

In an embodiment, when wireless device 332 is initially connected to network 320, service system 390 may require user level authentication before configuring network 320 to allow wireless device 332 access to storage network 340. In an embodiment, network 320 sends an authentication executable file to wireless device 332. This authentication executable file may be executed by host computer 330.

When executed by host computer 330, the authentication executable file may prompt the user for a username and/or password. The authentication executable file may then send the user's responses to network 320. Network 320 may then send the user's responses to service system 390. If the user supplied an appropriate username and corresponding password, service system 390 may configure network 320 to give host computer 330 access to storage 342 via storage network 340.

In an embodiment, the authentication executable file may be automatically executed by host computer 330 when wireless device 332 is enumerated as a locally attached mass storage device. For example, the authentication executable file may be automatically executed by informing host computer 330 that there is an "autorun.inf" file in the root directory of the locally attached mass storage device being emulated by wireless device 332. The "autorun.inf" file may then be automatically read by host computer 330. The "autorun.inf" file supplied to host computer 330 may then specify that the authentication executable file be executed by host computer 330.

In an embodiment, communication system 300 may require a user to manually run the authentication executable file. For example, the authentication executable file may appear as a "login.exe" file in the root directory of the locally attached mass storage device being emulated by wireless device 332. The "login.exe" file may then be executed when the user takes a certain action such as double clicking on the "login.exe" filename or icon.

In an embodiment, the authentication executable file may encrypt the user's responses before sending them. Thus, the user's responses may need to be decrypted before access to storage 342 is granted. In an embodiment, communication system 300 may match the device identifier of wireless device 332 to the username and password responses sent by host computer 330 when executing the authentication executable file. Thus, access to storage 342 by host computer 330 may be dependent upon the device identifier associated with wireless device 332 as well as a correct username and password.

Host computer 330 may also use communication and configuration protocols intended for locally attached mass storage devices to communicate with wireless device 332. Wireless device 332 may emulate a mass storage device by also using the corresponding communication and configuration protocols to communicate with host computer 330. Wireless device 332 may send and receive data to storage 342 via network 320 and storage network 340 to provide an emulated capacity (e.g., number of bytes) that is far greater than would normally be found on a locally attached mass storage device.

In an example, host computer 330 may use Advanced Technology Attachment Packet Interface (ATAPI) command blocks and command sets to communicate with wireless device 332. Likewise, wireless device 332 would use ATAPI command blocks and command sets to communicate with host computer 330.

In another example, host computer 330 may use the Small Computer System Interface (SCSI) commands to communicate with wireless device 332. Likewise, wireless device 332 would use SCSI commands to communicate with host computer 330. In the preceding examples, these protocols may be encapsulated in USB packets for communication with wireless device 332 via a USB port on host computer 330.

In order to facilitate the emulation of a locally attached mass storage device by wireless device 332, network 320 may process packets of data it receives from wireless device 332. These packets may, for example, comprise data destined for storage 342. In an example, these packets of data may contain data with communication and configuration protocols intended for locally attached mass storage devices to communicate. These communication and configuration protocols may be emulated by wireless device 332, network 320, or storage network 340. These communication and configuration protocols may also be simply passed along to storage 342 so that storage 342 may process them natively.

In an example, wireless device 332 may send, and network 320 may receive, transfer, or process, packets of data with Advanced Technology Attachment Packet Interface (ATAPI) command blocks and command sets. In another example, wireless device 332 may send, and network 320 may receive, transfer, or process, Small Computer System Interface (SCSI) commands. In another example, these protocols may be encapsulated in USB packets and wireless device 332 may send, and network 320 may receive, transfer, or process these USB packets.

Network 320 may process packets of data received from wireless device 332 to translate them into data or commands for storage 342 or storage network 340. Network 320 may also process packets of data received from storage 342 via storage network 340 to translate them into data or commands for wireless device 332. For example, network 320 may translate packets of data received from wireless device 332 into commands or data that is understood by a storage network 340 or storage 342. Network 320 may also translate packets of data received from storage 342 or storage network 340 into data or commands for wireless device 332.

In another example, network 320 may translate packets of data received from wireless device 332 with ATAPI, SCSI, or USB commands or protocols into commands or data that may be understood storage network 340 or storage 342. Network 320 may also translate packets of data received from storage 342 or storage network 340 into ATAPI, SCSI, or USB commands or protocols. These packets, once translated, may be sent to wireless device 332.

Storage network 340 and storage 342 comprise computer data storage connected to a computer network that provides data access to network clients. For example, storage network 340 together with storage 342 may be a SAN or network attached storage (NAS). Storage network 340 may comprise a network that is separate from, but operatively coupled to, network 320. In this case, storage 342 would also be separate from, but operatively coupled to, network 320. In an alternative, storage network 340 may be part of network 320. In this case, storage 342 may comprise storage that is part of network 320.

Figure 4:
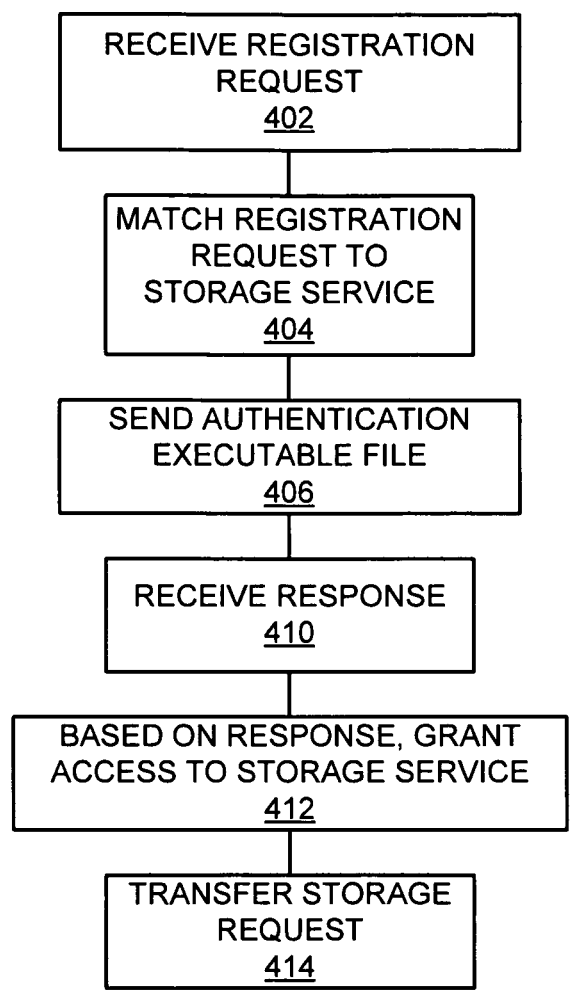
FIG. 4 is a flowchart illustrating a method of operating a communication system.

FIG. 4 is a flow chart illustrating a method of operating a communication system. The steps of FIG. 4 may be performed by communication system 300 or 100. In a step 402, a registration request is received. For example, the registration request may be received from wireless device 332 by base station 322. Base station 322 may then forward the registration request to network 320 which may further forward the registration request to service system 390.

In a step 404, a registration request is matched to a storage service. For example, service system 390 may match the registration request to a storage service by querying database 394. The registration request may be the registration request received in block 402. The registration request may be matched to a storage service by an association of a device identifier to a storage service. For example, a MAC address given in the registration request may be associated with a uniform resource locator (URL) that specifies a storage service. In another example, a MAC address may be associated with an internet protocol (IP) address and user datagram protocol (UDP) port number that provides a storage service. In another example, a URL identifies a computer system and a location (e.g., folder or directory) that will act as a storage service. In another example, a storage service may be associated with a username and password.

An authentication executable file is sent (406). For example, wireless device 332 may receive an authentication executable file from network 320. Wireless device 332 may present this authentication executable file to host computer 330 as a file that is stored in the root directory of the locally attached mass storage device that wireless device 332 is emulating. Host computer 330 may then execute the authentication executable file.

By running the authentication executable file, host computer 330 may then prompt a user for a username and password. Host computer 330, under the control of the authentication executable file, may then send the user's responses to network 320 via wireless device 332. Host computer 330 may send the user's responses by writing to a file that is stored in the root directory of the locally attached mass storage device that wireless device 332 is emulating. This may cause wireless device 332 to send the user's responses to network 320 and/or service system 390. In an embodiment, the authentication executable file may first encrypt the user's responses before they are sent to network 320. Thus, network 320 or service system 340 may decrypt the user's responses.

A response is received (410). For example, service system 390 may receive, via network 320, a username and password from host computer 330 that was generated by host computer 330 running the authentication executable file. Based on the received response, access may be granted to a storage service (412). For example, based on a username and password received in block 410, service system 390 may configure network 320 to grant access to a file stored on storage 342 via storage network 340. In another example, based on the device identifier received from wireless device 332, and a username and password, service system 390 may configure network 320 to grant access to a file or directory on storage 342.

In another example, host computer 330 may send the user's responses by writing to a file that is stored on network 320 or storage 342. These responses may be encrypted before they are written to the file stored on network 320 or storage 342. Service system 390 may then periodically poll the file stored on network 320 or storage 342 for changes. If a change is detected, and the username and password are verified, service system 390 may then configure network 320 to grant access to a file or directory on storage 342.

A storage request is transferred (414). For example, a storage request may be transferred from host computer 330 to storage network 340 once service system 390 has verified the user's responses. This storage request may be transferred to storage 342.

In a further example, the storage request may comprise a command to read or write data to or from storage 342. In this example, host computer 330 may have made a request to read data from the locally attached mass storage device that wireless device 332 is enumerated as or is emulating. For example, this request may comprise a SCSI request encapsulated in a USB packet. At least one of wireless device 332, network 320, or storage network 340 may translate this request into another protocol. For example, the encapsulated SCSI request may be translated to a file transfer protocol (FTP) request. The FTP request is then transferred to storage network 340.

Continuing the example, storage network 340 may then respond to the request with another request. For example, storage network 340 may respond with a packet containing data that wireless device 332 requested in the encapsulated SCSI request. The response request may be requesting that the response packet be sent to wireless device 332. At least one of wireless device 332, network 320, or storage network 340 translates this request into another protocol. For example, the response packet of data may be translated into a SCSI response encapsulated in a USB packet.

The methods, systems, networks, databases, and storage described above may be implemented with or executed by one or more computer systems. The methods described above may also be stored on a computer readable medium. Many of the elements of communication network 100 and communication network 300 may be, comprise, or include computers systems. This includes, but is not limited to communication system 100, host device 110, wireless device 112, network 120, service system 140, storage system 130, database 150, communication system 300, host computer 330, wireless device 332, base station 322, network 320, storage network 340, storage 342, service system 390, computer system 392 and database 394.

Figure 5:
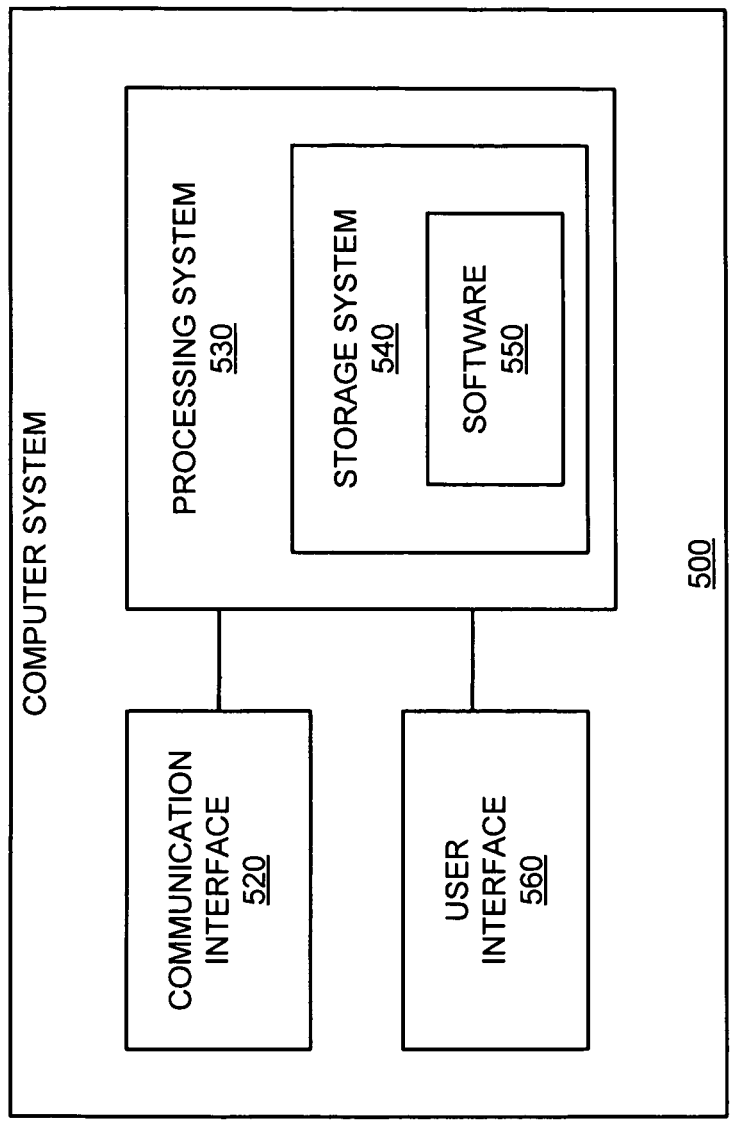
FIG. 5 is a block diagram illustrating a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a mobile communication device, the method comprising:
    transferring signals from a bus communication interface to a computer system to enumerate the mobile communication device as a locally connected mass storage device, wherein the computer system is operated by a user;
    wirelessly transferring a registration request from a wireless communication interface indicating a device identifier for the mobile communication device;
    transferring an instruction from the bus communication interface to the computer system to execute a user authentication executable file stored in the locally connected mass storage device;
    receiving a user response into the bus communication interface that was transferred by the computer system in response to executing the user authentication executable file;
    wirelessly transferring the user response from the wireless communication interface, wherein a wireless communication system receives and processes the registration request and the user response to authorize the mobile communication device and the user for an authorized data storage service;
    in the bus communication interface, exchanging data with the computer system to provide the authorized data storage service; and
    in the wireless communication interface, wirelessly exchanging the data with the wireless communication system to provide the authorized data storage service.

2. The method of claim 1 further comprising, in the wireless communication interface, wirelessly receiving the user authentication executable file from the wireless communication system in response to transferring the registration request.

3. The method of claim 1 wherein the bus communication interface comprises a Universal Serial Bus interface.

4. The method of claim 1 wherein the locally connected mass storage device comprises a Universal Serial Bus Mass Storage Class device.

5. The method of claim 1 wherein the user response comprises a username and password.

6. The method of claim 1 wherein the mobile communication device comprises a wireless phone.

7. The method of claim 1 wherein the mobile communication device comprises a wireless modem.

8. A mobile communication device characterized by:
    a bus communication interface configured to transfer signals to a computer system to enumerate the mobile communication device as a locally connected mass storage device, wherein the computer system is for operation by a user;
    a wireless communication interface configured to wirelessly transfer a registration request indicating a device identifier for the mobile communication device;
    the bus communication interface is configured to transfer an instruction to the computer system to execute a user authentication executable file stored in the locally connected mass storage device and to receive a user response that was transferred by the computer system in response to executing the user authentication executable file;
    the wireless communication interface is configured to wirelessly transfer the user response to a wireless communication system that is configured to receive and process the registration request and the user response to authorize the mobile communication device and the user for an authorized data storage service;
    the bus communication interface is configured to exchange data with the computer system to provide the authorized data storage service; and
    the wireless communication interface is configured to wirelessly exchange the data with the wireless communication system to provide the authorized data storage service.

9. The mobile communication device of claim 8 wherein the wireless communication interface is configured to wirelessly receive the user authentication executable file from the wireless communication system in response to transferring the registration request.

10. The mobile communication device of claim 8 wherein the bus communication interface comprises a Universal Serial Bus interface.

11. The mobile communication device of claim 8 wherein the locally connected mass storage device comprises a Universal Serial Bus Mass Storage Class device.

12. The mobile communication device of claim 8 wherein the user response comprises a username and password.

13. The mobile communication device of claim 8 wherein the mobile communication device comprises a wireless phone.

14. The mobile communication device of claim 8 wherein the mobile communication device comprises a wireless modem.

15. The mobile communication device of claim 8 wherein the mobile communication device comprises a wireless USB modem.

* * * * *